(12) United States Patent
Sato

(10) Patent No.: US 9,914,373 B2
(45) Date of Patent: Mar. 13, 2018

(54) SEAT SLIDE DEVICE

(71) Applicant: Aisin Seiki Kabushiki Kaisha, Kariya-shi (JP)

(72) Inventor: Takanori Sato, Kasugai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 51 days.

(21) Appl. No.: 15/227,987

(22) Filed: Aug. 4, 2016

(65) Prior Publication Data

US 2017/0036569 A1 Feb. 9, 2017

(30) Foreign Application Priority Data

Aug. 6, 2015 (JP) .................................. 2015-156507

(51) Int. Cl.
*F16M 13/00* (2006.01)
*B60N 2/08* (2006.01)
*B60N 2/07* (2006.01)

(52) U.S. Cl.
CPC ........... *B60N 2/0875* (2013.01); *B60N 2/073* (2013.01); *B60N 2/0705* (2013.01); *B60N 2/0715* (2013.01); *B60N 2/085* (2013.01); *B60N 2/0806* (2013.01); *B60N 2/0818* (2013.01)

(58) Field of Classification Search
USPC ...................................................... 248/429
See application file for complete search history.

(56) References Cited

U.S. PATENT DOCUMENTS

| | | | | |
|---|---|---|---|---|
| 5,806,825 A * | 9/1998 | Couasnon | ............ | B60N 2/0705 248/429 |
| 8,136,784 B2 * | 3/2012 | Yamada | ................. | B60N 2/071 248/424 |
| 8,393,591 B2 * | 3/2013 | Mizuno | ................ | B60N 2/0705 248/424 |
| 8,469,328 B2 * | 6/2013 | Nakamura | ........... | B60N 2/0705 248/424 |
| 9,162,588 B2 * | 10/2015 | Yamada | ............... | B60N 2/0722 |
| 9,393,883 B2 * | 7/2016 | Wojatzki | .............. | B60N 2/0818 |
| 9,566,878 B2 * | 2/2017 | Couasnon | ............ | B60N 2/0705 |
| 2004/0232750 A1 * | 11/2004 | Rohee | ...................... | B60N 2/08 297/334 |
| 2007/0090263 A1 * | 4/2007 | Yamada | ............... | B60N 2/0705 248/429 |

(Continued)

*Primary Examiner* — Monica Millner
(74) *Attorney, Agent, or Firm* — Oblon, McClelland, Maier & Neustadt, L.L.P.

(57) ABSTRACT

A seat slide device includes: a first rail which extends in a longitudinal direction; a second rail which extends in the longitudinal direction and is joined to the first rail to be capable of relative movement in the longitudinal direction; lock holes which form the first rail, are open in a portion facing the second rail, are provided to extend such that one end in a short direction of the first rail forms an opening portion, another end forms a base portion including a base wall, and which are disposed at an equal interval in the longitudinal direction; and a lock lever which is joined to the second rail in a state of being capable of reciprocal movement in the short direction and is provided integrally with engaging protrusions capable of entering and exiting any of the lock holes in accordance with the reciprocal movement.

4 Claims, 5 Drawing Sheets

(56) References Cited

U.S. PATENT DOCUMENTS

| | | | |
|---|---|---|---|
| 2007/0176072 A1* | 8/2007 | Ikegaya | B60N 2/0705 248/429 |
| 2008/0048086 A1* | 2/2008 | Kojima | B60N 2/0705 248/429 |
| 2012/0001049 A1* | 1/2012 | Selbold | B60N 2/0818 248/429 |

* cited by examiner

SEAT SLIDE DEVICE

CROSS REFERENCE TO RELATED APPLICATIONS

This application is based on and claims priority under 35 U.S.C. § 119 to Japanese Patent Application 2015-156507, filed on Aug. 6, 2015, the entire contents of which are incorporated herein by reference.

TECHNICAL FIELD

This disclosure relates to a seat slide device.

BACKGROUND DISCUSSION

In the related art, there is known a seat slide device for adjusting a seat position of a vehicle such as an automobile in a vehicle front-rear direction (for example, refer to Japanese Patent No. 3788637 (Reference 1)).

The seat slide device is provided with a first rail and a second rail which both extend in a longitudinal direction, and the rails are joined to be capable of relative movement in the longitudinal direction (specifically, a vehicle front-rear direction). One (a lower rail) of the first rail and the second rail is fixed to a floor of the vehicle, and the other (an upper rail) is fixed to a seat of the vehicle. The first rail includes a plurality of lock holes which are open in a portion facing the second rail and which are shaped to extend in a short direction (specifically, a vehicle top-bottom direction). The lock holes are disposed to line up at an equal interval in the longitudinal direction of the first rail. The second rail includes a lock lever which is joined such that one end may move reciprocally in the short direction. The end portion of the lock lever is integrally provided with engaging protrusions which are capable of entering and exiting any of the plurality of lock holes in accordance with the reciprocal movement.

In a state in which the engaging protrusions of the lock lever are exited from the lock holes, since the engaging protrusions do not engage with the lock holes, relative movement becomes possible between the first rail and the second rail, and it becomes possible to change the seat position. In a state in which the seat position is set to a desired position, when the lock lever is operated and the engaging protrusions of the lock lever enter the lock holes, the engaging protrusions of the lock lever are locked into the lock holes. Accordingly, the relative movement in the longitudinal direction between the first rail and the second rail is restricted, and the seat position is fixed at the desired position.

In the seat slide device, the relative movement in the longitudinal direction between the first rail and the second rail is restricted due to the engaging protrusions of the lock lever abutting against the inner surfaces of the lock holes. Therefore, in the inner surfaces of the lock holes, the inner surface shape of the portion against which the engaging protrusions abut is defined as a shape capable of supporting the engaging protrusions (specifically, the lock lever) at a desired orientation.

Ordinarily, one end portion of the lock hole in the short direction is a base portion which blocks the lock hole, and the inner surface shape of the base portion is a shape which facilitates the manufacture of the first rail, where a portion corresponding to the boundary between the base wall and the side wall of the lock hole being formed as a curved surface or the like, and the inner surface shape of the base portion is not a shape capable of appropriately supporting the lock lever.

In the seat slide device, although the engaging protrusions of the lock lever do not abut against the base portions of the lock holes at ordinary times, the engaging protrusions may abut against the base portions of the lock holes due to variation in the engaging protrusions and the lock holes with the passage of time, shock applied to the device in accordance with a vehicle collision, or the like. In this case, since it may no longer be possible to appropriately support the engaging protrusions of the lock lever with the inner surfaces of the lock holes, this can become a cause leading to destabilization of the fixing state of the seat position.

SUMMARY

Thus, a need exists for a seat slide device which is not suspectable to the drawback mentioned above.

A seat slide device according to an aspect of this disclosure includes a first rail which extends in a longitudinal direction, and a second rail which extends in the longitudinal direction and is joined to the first rail to be capable of relative movement in the longitudinal direction. The device is provided with a plurality of lock holes which form the first rail, are open in a portion facing the second rail, are provided to extend such that one end in a short direction of the first rail forms an opening portion, another end forms a base portion including a base wall, and which are disposed at an equal interval in the longitudinal direction. The device is provided with a lock lever which is joined to the second rail in a state of being capable of reciprocal movement in the short direction and is provided integrally with engaging protrusions capable of entering and exiting any of the plurality of lock holes in accordance with the reciprocal movement. In each of the lock holes, an inner surface of the base portion is a first surface with an inner surface shape which is defined with an object other than orientation management of the engaging protrusion during abutting of the engaging protrusion, an inner surface of a portion closer to the opening portion side than the base portion is a second surface with an inner surface shape which is defined in order to manage the orientation of the engaging protrusion during abutting of the engaging protrusion, and each of the lock holes includes a protruding portion which protrudes from the base wall to a position closer to the opening portion side than a boundary between the first surface and the second surface.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, description will be given of an embodiment of a seat slide device.

Figure 1:
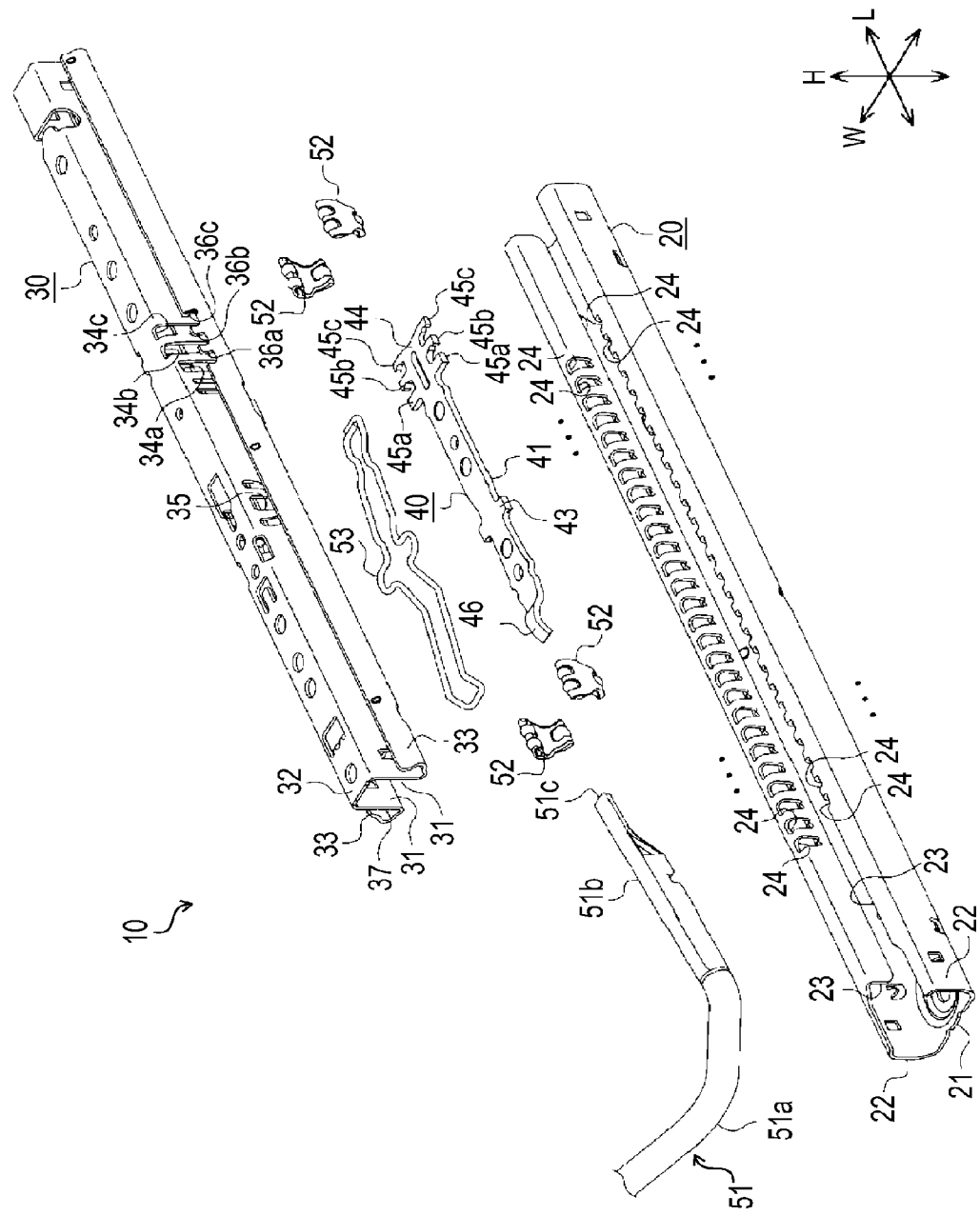
FIG. 1 is an exploded perspective diagram of a seat slide device.
Figure 2:
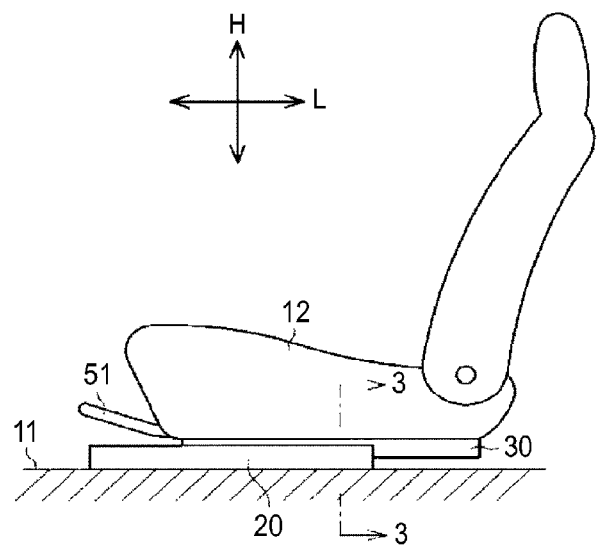
FIG. 2 is a side surface view of a seat and the seat slide device.

As illustrated in FIGS. 1 and 2, a seat slide device 10 is provided with lower rails 20 as the pair of first rails, and upper rails 30 as the pair of second rails. Each of the lower rails 20 is fixed to a vehicle floor 11 (FIG. 2). The lower rails 20 are shaped to extend in the longitudinal direction, and are arranged to extend in a vehicle front-rear direction L leaving an interval in a vehicle width direction W. The upper rail 30 is joined to each of the lower rails 20 to be capable of relative movement in the longitudinal direction (specifically, the vehicle front-rear direction L). Each of the upper rails 30 is also shaped to extend in the longitudinal direction, and is arranged to extend in the vehicle front-rear direction L. A vehicle seat 12 (FIG. 2) is fixed above the upper rails 30 on the vehicle. An operation handle 51 for performing positional adjustment of the seat 12 in the vehicle front-rear direction L in a state of extending to the vehicle front of the seat 12 is attached to each of the upper rails 30. In the seat slide device 10, the seat 12 (specifically, the upper rails 30) becomes capable of moving relative to the vehicle floor 11 (specifically, the lower rails 20) due to the operation handle 51 being lifted toward the top of the vehicle.

Hereinafter, detailed description will be given of the structure of the seat slide device 10.

Figure 3:
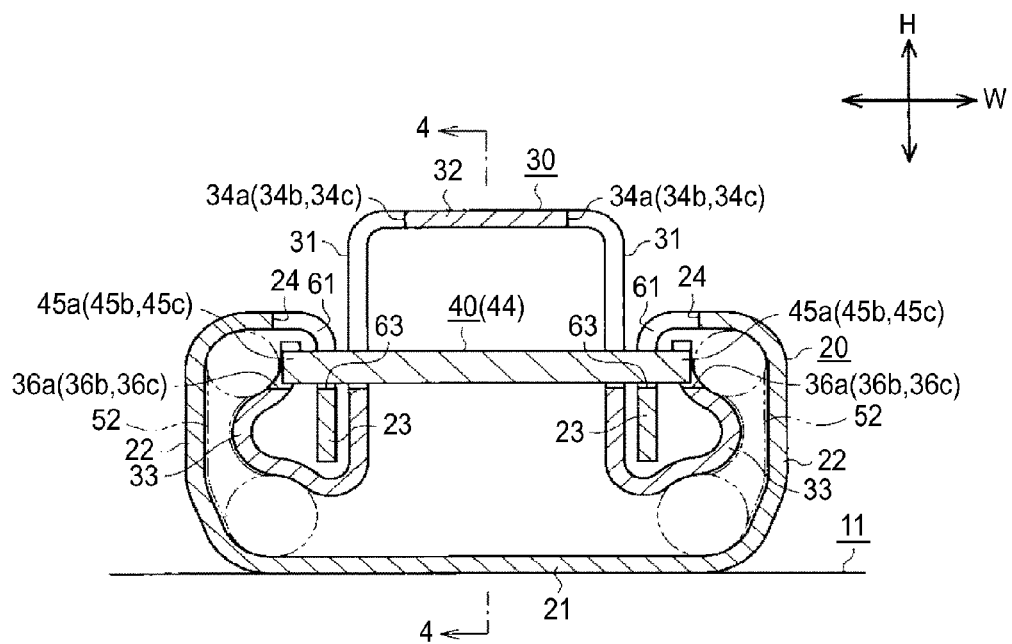
FIG. 3 is a sectional diagram of the seat slide device taken along line 3-3 of FIG. 2.

As illustrated in FIGS. 1 and 3, the lower rail 20 is provided with a base wall portion 21 which is fixed to the vehicle floor 11 (FIG. 3). Outer wall portions 22 are provided to stand at each end of the base wall portion 21 in the vehicle width direction W. Fold-back portions 23 which are folded back to the inside in the vehicle width direction W are provided to extend on each of the end portions of the vehicle top side of the outer wall portions 22.

Lock holes 24 which are through holes extending in the short direction (specifically, a vehicle top-bottom direction H) of the lower rail 20 are provided in each of the fold-back portions 23 such that a plurality of the lock holes 24 are lined up in the longitudinal direction (specifically, the vehicle front-rear direction L) of the lower rail 20 at an equal interval. The end portions of the vehicle top side of the lock holes 24 serve as opening portions 61 which are open to the top of the vehicle (FIG. 3), the end portions of the vehicle bottom side of the lock holes 24 are provided to extend so as to form base portions 63 which include the base walls, and the lock holes 24 are open at a portion facing side wall portions 31 of the upper rails 30.

The upper rail 30 is disposed between the fold-back portions 23 of the lower rail 20, and is provided with the pair of side wall portions 31 which face each other in the vehicle width direction W. The side wall portions 31 are formed integrally by a plate-shaped top wall portion 32 which joins the end portions of the vehicle top side. A fold-back portion 33 which is folded back to the outside in the vehicle width direction W is provided to extend on the end portion of the vehicle bottom side of each of the side wall portions 31. The fold-back portion 33 is disposed in a space which is surrounded by the outer wall portion 22 and the fold-back portion 23 of the lower rail 20. Accordingly, the relative movement of the upper rail 30 in the vehicle top-bottom direction H and the vehicle width direction W in relation to the lower rail 20 is restricted.

A plurality of (in this embodiment, four) retainers 52 are attached between the outer wall portions 22 of the lower rail 20 and the fold-back portions 33 of the upper rail 30, and each of the retainers 52 is provided with a ball-shaped rotational body. The lower rail 20 and the upper rail 30 move smoothly relative to each other due to the retainers 52 sliding and rolling on the outer wall portions 22 of the lower rail 20 and the fold-back portions 33 of the upper rail 30.

A plurality of (in this embodiment, three) insertion holes 34a, 34b, and 34c are provided in each of the side wall portions 31 of the upper rail 30. The insertion holes 34a to 34c are disposed at an equal interval in the vehicle front-rear direction L, and the interval is the same as the interval between the lock holes 24. Each of the insertion holes 34a to 34c is formed in a shape which extends in the vehicle top-bottom direction H. Each insertion hole 35 (FIG. 1) is formed in a portion closer to the vehicle front side than the insertion holes 34a to 34c in the side wall portions 31 of the upper rail 30.

The same number (in this embodiment, three) of engaging grooves 36a, 36b, and 36c are provided as the number of the insertion holes 34a to 34c on the respective end portions of the vehicle top side of each of the fold-back portions 33 of the upper rail 30. The engaging grooves 36a to 36c are disposed at an equal interval in the vehicle front-rear direction L, and the interval is the same as the interval between the insertion holes 34a to 34c and the interval between the lock holes 24. The engaging grooves 36a to 36c are shaped by forming substantially rectangular shaped notches in the tips of the fold-back portions 33, and are provided to face the insertion holes 34a to 34c in the vehicle width direction W.

A lock lever 40 is attached to the inner portion (hereinafter, "an upper rail main body interior") of a space which is surrounded by the side wall portions 31 and the top wall portion 32 of the upper rail 30. The lock lever 40 is provided with a main body portion 41 which is formed in a long plate shape extending in the vehicle front-rear direction L.

Figure 4:
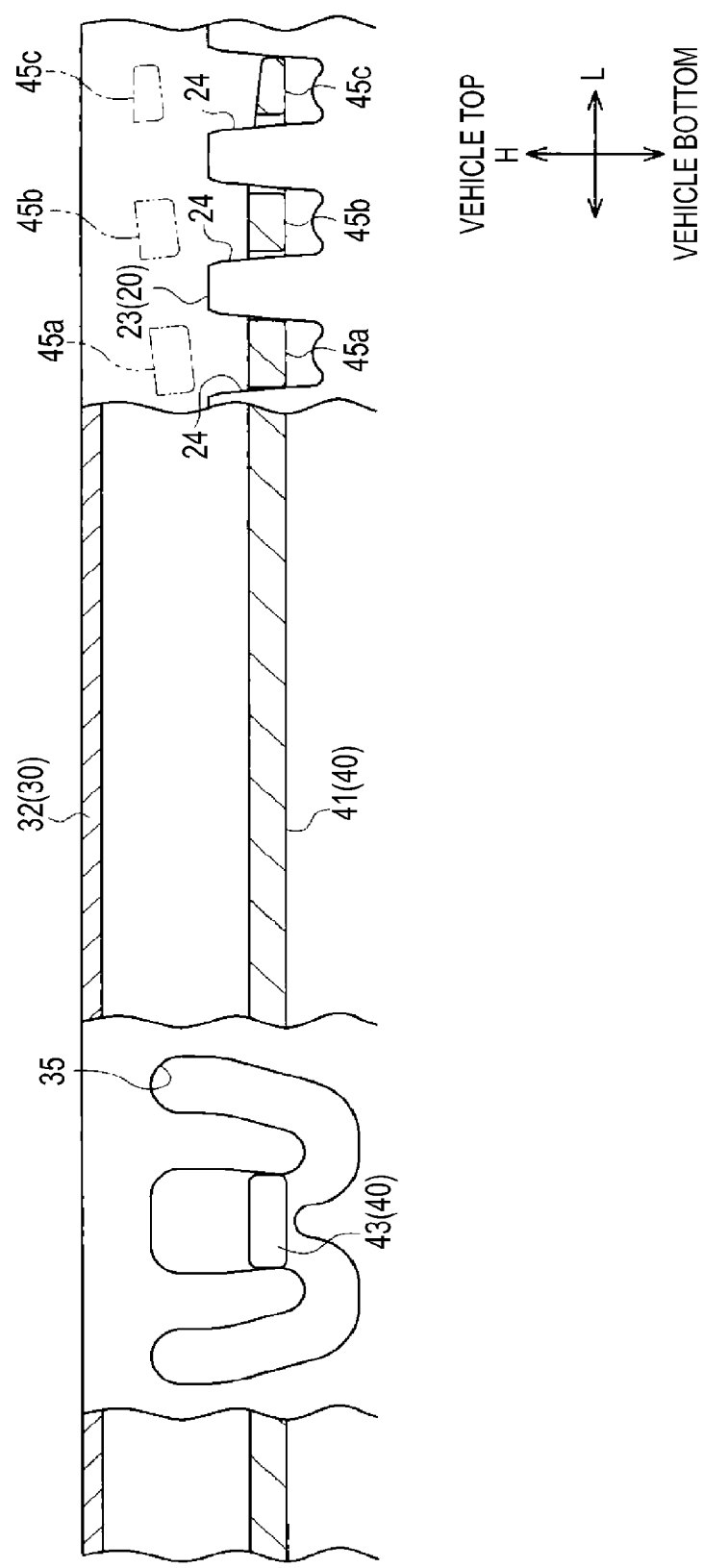
FIG. 4 is a sectional diagram of a portion of the seat slide device taken along line 4-4 of FIG. 3.

As illustrated in FIGS. 1 and 4, a pair of rotating shaft portions 43 (FIG. 1) are formed on the middle portion of the main body portion 41 in the vehicle front-rear direction L. The pair of rotating shaft portions 43 are shaped to protrude from both sides in the vehicle width direction W to the outside. The lock lever 40 is supported by the upper rail 30 to rotate freely by attaching the lock lever 40 to the upper rail 30 in a state in which the rotating shaft portions 43 are inserted into the insertion holes 35 of the upper rail 30.

A plurality of (in this embodiment, six) of engaging protrusions 45a, 45b, and 45c are formed integrally on an end portion (a rear end portion 44) of the vehicle rear side of the main body portion 41 of the lock lever 40. The engaging protrusions 45a to 45c are disposed at an equal interval in the vehicle front-rear direction L in a shape which protrudes from both sides toward the outside in the vehicle width direction W of the rear end portion 44. The engaging protrusions 45a to 45c have an interval in the vehicle front-rear direction L which is the same as the interval between the insertion holes 34a to 34c and the interval between the lock holes 24. By attaching the lock lever 40 to the upper rail 30 in a state in which the engaging protrusions 45a are inserted into the insertion holes 34a, the engaging protrusions 45b are inserted into the insertion holes 34b, and the engaging protrusions 45c are inserted into the insertion holes 34c, the engaging protrusions 45a to 45c become capable of reciprocal movement along the insertion holes 34a to 34c when rotating the lock lever 40.

As illustrated in FIG. 3, the length in the vehicle width direction W of a portion which includes the engaging protrusions 45a to 45c in the lock lever 40 is greater than the distance in the vehicle width direction W between the outer surfaces of the side wall portions 31 of the upper rail 30. Therefore, the engaging protrusions 45a to 45c of the lock lever 40 protrude to the outside of the side wall portions 31 of the upper rail 30 via the insertion holes 34a to 34c of the upper rail 30. In the seat slide device 10, in accordance with the reciprocal movement of the engaging protrusions 45a to 45c of the lock lever 40 caused by the rotation of the lock lever 40, the engaging protrusions 45a to 45c become capable of entering and exiting any of the plurality of lock holes 24.

Specifically, as illustrated in FIG. 4, when the engaging protrusions 45a to 45c of the lock lever 40 enter a state (the state illustrated with a solid line in FIG. 4) of moving down in the vehicle and entering the lock holes 24 of the lower rail 20, the engaging protrusions 45a to 45c are locked by abutting the inner surfaces of the lock holes 24. Accordingly, the engaging protrusions 45a to 45c enter the locked state in which the relative movement in the vehicle front-rear direction L between the lower rail 20 and the upper rail 30 is restricted. Meanwhile, when the engaging protrusions 45a to 45c of the lock lever 40 move upward in the vehicle and enter a state of exiting the lock holes 24 of the lower rail 20 (the state illustrated with a dotted line in FIG. 4), the locking of the engaging protrusions 45a to 45c by the lock holes 24 is released, and the engaging protrusions 45a to 45c enter an unlocked state in which the relative movement in the vehicle front-rear direction L between the lower rail 20 and the upper rail 30 is permitted.

As illustrated in FIG. 1, a spring 53 is disposed between the top wall portion 32 and the lock lever 40 in the upper rail main body interior. The spring 53 is fixed to the upper rail 30. The lock lever 40 is constantly biased by the spring 53 in a direction which moves the rear end portion 44 of the lock lever 40 to the vehicle bottom side, that is, in a direction which holds the locked state.

The operation handle 51 which is formed by folding a pipe member is connected to the end portion (a front end portion 46) of the vehicle front side of the main body portion 41 of the lock lever 40. The operation handle 51 has a well-known configuration provided with an operation portion 51a which is disposed in front of the seat 12 and extends in the vehicle width direction W, and a pair of insertion portions 51b which extend along the upper rails 30. The operation handle 51 extends from a front opening portion 37 of the upper rail 30 in a state in which tips 51c of the insertion portions 51b are inserted into the upper rail main body interior.

The insertion portions 51b of the operation handle 51 are supported from the vehicle bottom side by the end portion of the vehicle front side of the spring 53. The insertion portions 51b of the operation handle 51 are biased by the biasing force of the spring 53 in a direction which moves the insertion portions 51b toward the vehicle top, that is, in a direction which holds the locked state.

Therefore, when the operation handle 51 is not operated, the engaging protrusions 45a to 45c of the lock lever 40 enter the locked state of being locked into the lock holes 24 of the lower rail 20 due to the biasing force of the spring 53. Meanwhile, when the operation handle 51 is operated so as to pull the operation portion 51a toward the vehicle top, the tip 51c of the operation handle 51 pushes the front end portion 46 of the lock lever 40 downward against the biasing force of the spring 53, and the lock lever 40 rotates. Accordingly, the engaging protrusions 45a to 45c which are provided on the rear end portion 44 of the lock lever 40 move toward the vehicle top, exit from the lock holes 24 of the lower rail 20, the locked state is released, and the engaging protrusions 45a to 45c enter the unlocked state.

Figure 5:
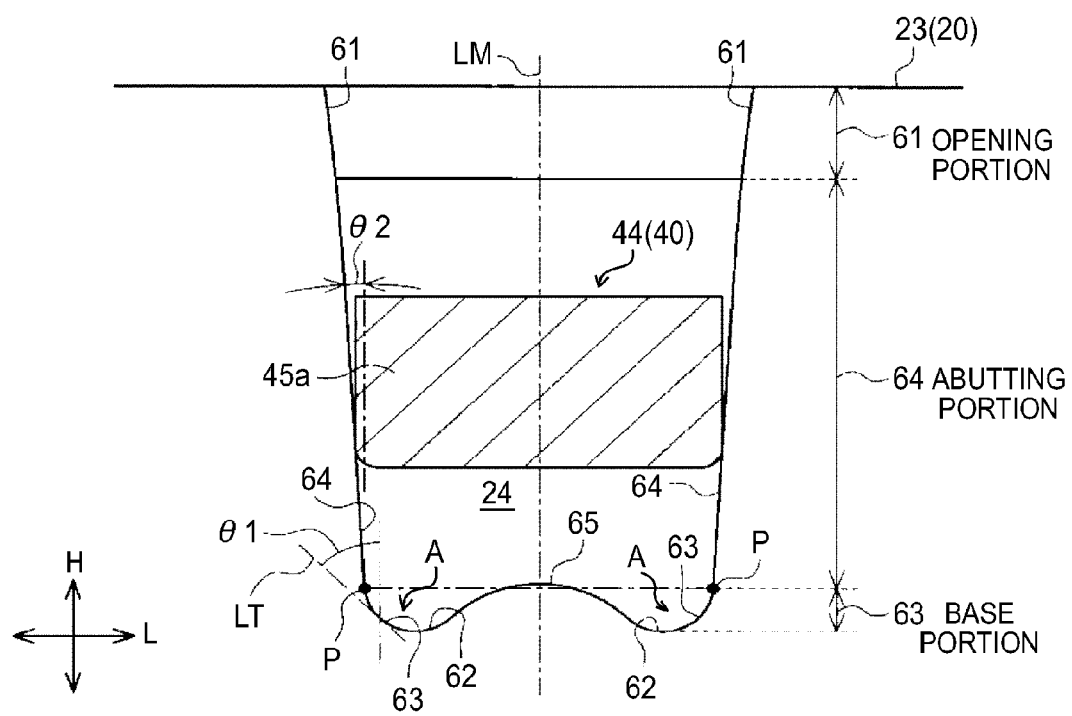
FIG. 5 is a side surface view of a lock hole as viewed from a side wall portion side of an upper rail.

Here, in the seat slide device 10, the relative moment in the vehicle front-rear direction L between the lower rail 20 and the upper rail 30 is restricted due to the engaging protrusions 45a to 45c of the lock lever 40 abutting the inner surfaces of the lock holes 24. Therefore, as illustrated in FIG. 5, the inner surface shapes of abutting portions 64 to which the engaging protrusions 45a to 45c (only the engaging protrusion 45a is depicted in FIG. 5) abut in the inner surfaces of the lock holes 24 are defined so as to manage the orientation of the engaging protrusions 45a to 45c (specifically, the lock lever 40) during the abutting of the engaging protrusions 45a to 45c. Specifically, the inner surface of the abutting portion 64 is formed of a planar surface (curvature=0), and is tapered such that the width in the vehicle front-rear direction L narrows toward the vehicle bottom. A second pressure angle $\theta2$ which is an angle between the inner surface of the abutting portion 64 and the vehicle top-bottom direction H (specifically, a direction perpendicular to the relative movement direction of the lower rail 20 and the upper rail 30) is a small angle. Accordingly, when the engaging protrusions 45a to 45c of the lock lever 40 abut against the inner surfaces of the abutting portions 64, since the force acting to move the engaging protrusions 45a to 45c in the direction of the vehicle top decreases, the engaging protrusions 45a to 45c are appropriately supported by the inner surfaces of the abutting portions 64 in a state in which the movement of the engaging protrusions 45a to 45c in the vehicle front-rear direction L is restricted. In this embodiment, the inner surface of the abutting portion 64 corresponds to the second surface.

Meanwhile, the shape of the inner surface of the base portion 63 of the lock hole 24 is defined in order to facilitate the manufacturing of the lower rail 20. The inner surface shape of the base portion 63 is defined for an object other than the orientation management of the engaging protrusions 45a to 45c during the abutting of the engaging protrusions 45a to 45c, and is not a shape capable of appropriately supporting the lock lever 40. Specifically, the inner surface of a portion from the end portion of the abutting portion 64 side to a base wall 62 in the base portion 63 of the lock hole 24 is a curved surface which extends with the same diameter. The boundary between the inner surface of the abutting portion 64 and the base portion 63 is a smooth surface with no corners. Accordingly, the curvature (>0) of a portion (the portion indicated by an arrow A in FIG. 5) from the boundary with the inner surface of the abutting portion 64 in the inner surface of the base portion 63 to the base wall 62 is greater than the curvature (=0) of the inner surface of the abutting portion 64. A first pressure angle $\theta1$, which is the angle between the inner surface (specifically, a tangential line LT thereof) of the portion A in the inner surface of the base portion 63 and the vehicle top-bottom direction H, is greater than the second pressure angle $\theta2$ of the inner surface of the abutting portion 64. In this embodiment, the inner surface of the base portion 63 corresponds to the first surface.

In the seat slide device 10, the shapes of the engaging protrusions 45a to 45c and the shapes of the lock holes 24 are defined such that the engaging protrusions 45a to 45c of the lock lever 40 do not contact the base portions 63 of the lock holes 24 at ordinary times. Nevertheless, there is a possibility that the engaging protrusions 45a to 45c will abut against the base portions 63 of the lock holes 24 due to variation in the engaging protrusions 45a to 45c and the lock holes 24 with the passage of time, application of shock to the seat slide device 10 together with a vehicle collision, or the like. In this case, the engaging protrusions 45a to 45c of the lock lever 40 abut portions formed of curved surfaces in the base portions 63 of the lock holes 24, that is, portions in which the pressure angle (the first pressure angle θ1) is large, the force acting to move the lock lever 40 in the direction of the vehicle top side increases in comparison with at ordinary times, and this is a cause leading to the destabilization of the locked state.

In light of this point, in this embodiment, a protruding portion 65, which is shaped to protrude to a position closer to the opening portion 61 side than the boundary between the inner surface of the abutting portion 64 and the inner surface of the base portion 63, is provided on the base wall 62 of the lock hole 24. In the seat slide device 10, the boundary between the inner surface of the abutting portion 64 and the inner surface of the base portion 63 becomes a line (the dot-and-dash line in FIG. 6) which joins the portions (the portions indicated by "P" in FIG. 6) at which the curvature and the pressure angle of the inner surface in both side walls of the lock hole 24 vary.

Hereinafter, description will be given of the operations and effects of providing the protruding portion 65.

Figure 6:
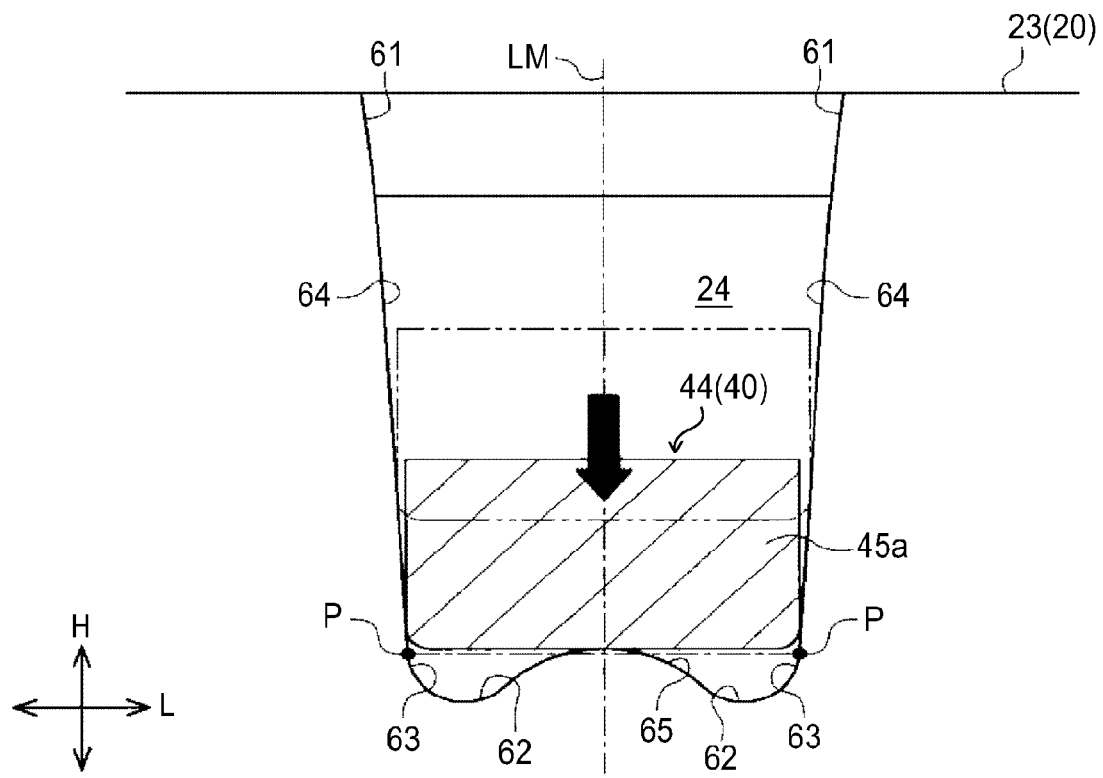
FIG. 6 is a side surface view of the lock hole as viewed from the side wall portion side of the upper rail.

As illustrated in FIG. 6, even in a case in which the engaging protrusions 45a to 45c (only the engaging protrusion 45a is depicted in FIG. 6) of the lock lever 40 move to enter the base portions 63 of the lock holes 24, since the engaging protrusions 45a to 45c hit the protruding portions 65 which are provided on the base walls 62 of the lock holes 24, the entrance of the engaging protrusions 45a to 45c into the base portions 63 of the lock holes 24 is suppressed. Therefore, abutting of the engaging protrusions 45a to 45c of the lock lever 40 against the inner surfaces of the base portions 63 of the lock holes 24, that is, a portion with a large pressure angle is suppressed. Accordingly, it is possible to cause the engaging protrusions 45a to 45c of the lock lever 40 to abut against the inner surfaces of the abutting portions 64 in which the inner surface shape is defined in order to manage the orientation of the engaging protrusions 45a to 45c during the abutting of the engaging protrusions 45a to 45c.

According to this embodiment, even in a case in which the engaging protrusions 45a to 45c of the lock lever 40 move so as to enter the base portions 63 of the lock holes 24, it is possible to appropriately support the engaging protrusions 45a to 45c of the lock lever 40 using the inner surfaces of the lock holes 24. Accordingly, since it is possible to appropriately restrict the relative movement in the vehicle front-rear direction L between the lower rail 20 and the upper rail 30, it is possible to suppress the destabilization of the locked state of the relative movement, and thus, it is possible to suppress the destabilization of the fixing state of the position of the seat 12.

In the seat slide device 10, the points of the protruding portions 65 of the lock holes 24 as viewed from the side wall portion 31 side of the upper rail 30 are a curved shape which is convex toward the protruding direction (upward in FIG. 6). Therefore, when the engaging protrusions 45a to 45c of the lock lever 40 hit the protruding portions 65 of the lock holes 24, the portions of the protruding portions 65 which the engaging protrusions 45a to 45c hit are curved surfaces. Therefore, it is possible to suppress the wear and deformation of the touching portions of the engaging protrusions 45a to 45c and the protruding portions 65 in comparison to a device in which the points of the protruding portions 65 are sharp curved shapes.

In the seat slide device 10, the inner surface of the boundary portion between the protruding portion 65 and the base wall 62 as viewed from the side wall portion 31 side of the upper rail 30 is a curved shape which is convex toward the vehicle bottom. Here, it is possible to manufacture the lower rail 20 through press molding. In the press molding, it is difficult to machine a molded product having through holes the inner surface of which includes curved surfaces. In the seat slide device 10, since the boundary portion between the protruding portion 65 and the base wall 62 and the point of the protruding portion 65 are curved surfaces, in comparison to a case in which portions thereof are curved surfaces, it is possible to easily perform the formation of the lower rail 20 in a case in which the lower rail 20 is manufactured by press molding.

In the seat slide device 10, the opening shape in the portion of each of the lock holes 24 facing the side wall portion 31 of the upper rail 30, that is, the opening shape of each of the lock holes 24 as viewed from the side wall portion 31 side of the upper rail 30 is a reflectively symmetrical shape in which a straight line (straight line LM in FIG. 6) extending in the vehicle top-bottom direction H is the axis of symmetry. Therefore, when the engaging protrusions 45a to 45c of the lock lever 40 hit the protruding portions 65 of the lock holes 24, it is possible to support, in a balanced manner, the engaging protrusions 45a to 45c of the lock lever 40 with the points of the protruding portions 65 in a state in which the deviation in the vehicle front-rear direction L is suppressed (the state illustrated in FIG. 6).

As described above, according to this embodiment, the following effects may be obtained.

(1) Since the protruding portion 65, which is shaped to protrude to a position closer to the opening portion 61 side than the boundary between the inner surface of the abutting portion 64 and the inner surface of the base portion 63, is provided on the base wall 62 of the lock hole 24, it is possible to suppress the destabilization of the fixing state of the seat 12 position.

(2) The point of the protruding portion 65 of each of the lock holes 24 as viewed from the side wall portion 31 side of the upper rail 30 is a curved shape which is convex toward the protruding direction. Therefore, it is possible to suppress the wear and deformation of the touching portions of the engaging protrusions 45a to 45c and the protruding portions 65 in comparison to a device in which the points of the protruding portions 65 are sharp curved shapes. It is possible to easily form the lower rail 20 in a case in which the lower rail 20 is formed by press molding in comparison to a case in which the points of the protruding portions of the lower rail 20 are curved surfaces.

(3) The opening shape in the portion of each of the lock holes 24 facing the side wall portion 31 of the upper rail 30 is a reflectively symmetrical shape in which the straight line LM extending in the vehicle top-bottom direction H is the axis of symmetry. Therefore, when the engaging protrusions 45a to 45c of the lock lever 40 hit the protruding portions 65 of the lock holes 24, it is possible to support, in a balanced manner, the engaging protrusions 45a to 45c of the lock lever 40 using the protruding portions 65 in a state in which the deviation in the vehicle front-rear direction L is suppressed.

The embodiment described above may be modified as described below.

The inner surface of the abutting portion 64 may be formed of a curved surface. In this case, the curvature of the inner surface of the abutting portion 64 may be set to a fixed curvature which is smaller than the curvature of the inner surface of the base portion 63 at the boundary portion between the abutting portion 64 and the base portion 63. In the seat slide device, a line joining the portions at which the curvature of the inner surface in both side walls of the lock hole 24 changes, or a line joining the portions at which the pressure angle in both side walls of the lock hole 24 changes may be used as the boundary between the inner surface of the abutting portion 64 and the inner surface of the base portion 63.

A portion of the inner surface of the base wall 62 of the lock hole 24 may be formed of a surface with the same curvature as the inner surface of the abutting portion 64 or a surface (for example, a planar surface) which has a smaller curvature than the inner surface of the abutting portion 64. In this case, the curvature of the inner surface of the base portion 63 at the boundary portion between the abutting portion 64 and the base portion 63 may be greater than the curvature of the inner surface of the abutting portion 64. In the seat slide device, a line joining the portions at which the curvature of the inner surface in both side walls of the lock hole 24 changes, or a line joining the portions at which the pressure angle in both side walls of the lock hole 24 changes may be used as the boundary between the inner surface of the abutting portion 64 and the inner surface of the base portion 63.

The shape of the protruding portion 65 may be changed arbitrarily as long as the shape is such that the point of the protruding portion 65 protrudes closer to the opening portion 61 side than the boundary between the abutting portion 64 and the base portion 63. For example, the protruding portion may be set to a shape in which the shape of the point as viewed from the side wall portion 31 of the upper rail 30 is a curved shape, or may be set to a shape in which the protruding portion includes a plurality of portions which protrude further to the opening portion 61 side than the boundary between the inner surface of the abutting portion 64 and the inner surface of the base portion 63. In addition, it is possible to provide a plurality of protruding portions on the base wall 62 of the lock hole 24, the protruding portions being shaped to protrude from the base wall 62 to a position closer to the opening portion 61 side than the boundary between the inner surface of the abutting portion 64 and the inner surface of the base portion 63.

The upper rail 30 may be fixed to the vehicle floor 11, and the seat 12 may be fixed to the lower rail 20.

A seat slide device according to an aspect of this disclosure includes a first rail which extends in a longitudinal direction, and a second rail which extends in the longitudinal direction and is joined to the first rail to be capable of relative movement in the longitudinal direction. The device is provided with a plurality of lock holes which form the first rail, are open in a portion facing the second rail, are provided to extend such that one end in a short direction of the first rail forms an opening portion, another end forms a base portion including a base wall, and which are disposed at an equal interval in the longitudinal direction. The device is provided with a lock lever which is joined to the second rail in a state of being capable of reciprocal movement in the short direction and is provided integrally with engaging protrusions capable of entering and exiting any of the plurality of lock holes in accordance with the reciprocal movement. In each of the lock holes, an inner surface of the base portion is a first surface with an inner surface shape which is defined with an object other than orientation management of the engaging protrusion during abutting of the engaging protrusion, an inner surface of a portion closer to the opening portion side than the base portion is a second surface with an inner surface shape which is defined in order to manage the orientation of the engaging protrusion during abutting of the engaging protrusion, and each of the lock holes includes a protruding portion which protrudes from the base wall to a position closer to the opening portion side than a boundary between the first surface and the second surface.

According to the device, even in a case in which the engaging protrusions of the lock lever move to enter the base portions of the lock holes due to variation in the engaging protrusions of the lock lever and the lock holes with the passage of time, shock applied to the device, or the like, since the engaging protrusions of the lock lever hit the protruding portions which are provided on the base walls of the lock holes, the entrance of the engaging protrusions into the base portions of the lock holes is suppressed. Therefore, the abutting of the engaging protrusions of the lock lever against the inner surfaces of the base portions of the lock holes, that is, the second surface with an inner surface shape which is defined with an object other than orientation management of the engaging protrusions during the abutting of the engaging protrusions is suppressed. Accordingly, the engaging protrusions of the lock lever abut against the inner surfaces of portions closer to the opening portion side than the base portions of the lock holes, that is, the first surface with an inner surface shape which is defined in order to manage the orientation of the engaging protrusions during the abutting of the engaging protrusions. Therefore, according to the device, even in a case in which the engaging protrusions of the lock lever move so as to enter the base portions of the lock holes, it is possible to appropriately support the engaging protrusions of the lock lever using the inner surfaces of the lock holes. Accordingly, since it is possible to appropriately restrict the relative movement in the longitudinal direction between the first rail and the second rail, it is possible to suppress the destabilization of the fixing state of the seat position.

In the seat slide device, it is preferable that a point of the protruding portion has a curved shape which is convex in a protruding direction.

According to the device with this configuration, when the engaging protrusions of the lock lever hit the protruding portions of the lock holes, the portions of the protruding portion which the engaging protrusions hit are curved surfaces. Therefore, it is possible to suppress the wear and deformation of the touching portions of the engaging protrusions and the protruding portions in comparison to a device in which the points of the protruding portions are sharp curved shapes.

In the device, it is preferable that an opening shape in a portion of the lock hole facing the second rail is a reflectively symmetrical shape in which a straight line extending in the short direction is an axis of symmetry.

According to the device with this configuration, when the engaging protrusions of the lock lever hit the protruding portions of the lock holes, it is possible to support, in a balanced manner, the engaging protrusions of the lock lever using the protruding portions in a state in which the deviation in the longitudinal direction is suppressed.

In the device, it is preferable that a curvature of the second surface is fixed, and a curvature of a boundary portion between the first surface and the second surface is greater than the curvature of the second surface.

According to the device with this configuration, a portion at which the curvature of the inner surface in both side walls of the lock hole changes is the boundary between the first surface and the second surface.

In the device, it is preferable that a second pressure angle which is an angle formed between the second surface and the short direction is fixed, and a first pressure angle which is an angle formed between the short direction and the first surface in a boundary portion between the first surface and the second surface is greater than the second pressure angle.

According to the device with this configuration, a portion at which the pressure angle in both side walls of the lock hole changes is the boundary between the first surface and the second surface.

According to the aspect of this disclosure, it is possible to suppress the destabilization of the fixing state of the seat position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat slide device, comprising:
   a first rail which extends in a longitudinal direction;
   a second rail which extends in the longitudinal direction and is joined to the first rail to have relative movement in the longitudinal direction;
   a plurality of lock holes included with the first rail, are open in a portion facing the second rail, are provided to extend such that one end in a short direction of the first rail forms an opening portion, another end forms a base portion including a base wall, and which are disposed at an equal interval in the longitudinal direction; and
   a lock lever which is joined to the second rail having reciprocal movement in the short direction and is provided integrally with engaging protrusions configured to enter and exit any of the plurality of lock holes in accordance with the reciprocal movement,
   wherein in each of the lock holes, an inner surface of the base portion is a first surface, an inner surface of a portion closer to an opening portion side than the base portion is a second surface which is configured to orient the engaging protrusion during abutting of the engaging protrusion, and each of the lock holes includes a protruding portion which protrudes from the base wall to a position closer to the opening portion side than a boundary between the first surface and the second surface,
   wherein a first pressure angle which is an angle formed between the short direction and the first surface in a boundary portion between the first surface and the second surface is greater than a second pressure angle, and
   wherein the second pressure angle which is an angle formed between the second surface and the short direction is fixed.

2. The seat slide device according to claim 1, wherein a point of the protruding portion has a curved shape which is convex in a protruding direction.

3. The seat slide device according to claim 1, wherein an opening shape in a portion of each of the lock holes facing the second rail is a reflectively symmetrical shape in which a straight line extending, in the short direction is an axis of symmetry.

4. The seat slide device according to claim 1, wherein a curvature of the second surface is fixed, and wherein a curvature of a boundary portion between the first surface and the second surface is greater than the curvature of the second surface.

* * * * *